Figure 3:
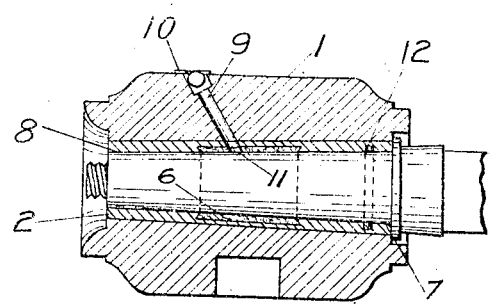

J. D. JONES.
WHEEL HUB BOX.
APPLICATION FILED SEPT. 14, 1910.

1,020,287.

Patented Mar. 12, 1912.

Witnesses.
Frank A. Bullington
W. A. Burke

Inventor
John D. Jones
By [signature]
Attorney

UNITED STATES PATENT OFFICE.

JOHN D. JONES, OF WALLA WALLA, WASHINGTON.

WHEEL-HUB BOX.

1,020,287.

Specification of Letters Patent.

Patented Mar. 12, 1912.

Application filed September 14, 1910. Serial No. 582,104.

*To all whom it may concern:*

Be it known that I, JOHN D. JONES, a citizen of the United States, residing in the city of Walla-Walla, county of Walla Walla, and State of Washington, have invented certain new and useful Improvements in Wheel-Hub Boxes, of which the following is a specification.

This invention relates to wheel hub boxes, and more particularly to a removable box or thimble for wheel hubs having formed in its middle portion, by a circumferential enlargement, an inwardly opening pocket or chamber for lubricant-retaining material adapted to bear upon the bearing face of the axle or spindle upon which it turns, which enlargement also removes the middle portion of said box which acts ordinarily as a fulcrum upon which the hub rocks after the ends of the spindle upon which it turns commences to wear, thereby to a considerable extent diminishing the wear upon said spindle.

Among the salient objects of the invention are,—to provide a removable box or thimble for a wheel hub which is capable of being substituted for wheel boxes now in use and which is provided with a lubricant-receiving pocket or chamber opening through its bearing face, whereby lubricant is applied directly to the axle or spindle upon which it turns; to provide in such a box or thimble a circumferential enlargement in the middle portion thereof and extending longitudinally thereof for a considerable part of its length, whereby to prevent the hub from rocking as the spindle or skein commences to wear at the ends thereof; to form such pocket or chamber so that its edges are undercut or overlapping and constitute a means for holding within said pocket or chamber lubricant packing which engages the spindle for a considerable area surrounding same, whereby lubricant therefrom is caused to work toward each end of the box and to thoroughly lubricate the bearing faces of the box and axle under the wiping effect therebetween as the hub turns upon the axle; to provide in such a box or thimble and the hub thereof, a lubricant port or passageway therethrough from the exterior of said hub to the box or thimble and in communication with the retaining pocket thereof; to provide in such a box or thimble a dust guard carried thereby, to prevent the admission of dust and dirt between the bearing faces of the box and axle upon which it turns; and, in general, to provide an improved, simple and effective bearing box or thimble for hubs which can be readily adapted to the hubs of wagon wheels in common use without expense and by means of which lubricant can be quickly and effectively applied to the bearing surfaces without removing the wheel from the axle.

The invention will be readily understood from the following description thereof, taken in connection with the drawings illustrating the preferred embodiment of the invention, and in which:—

Figure 1:
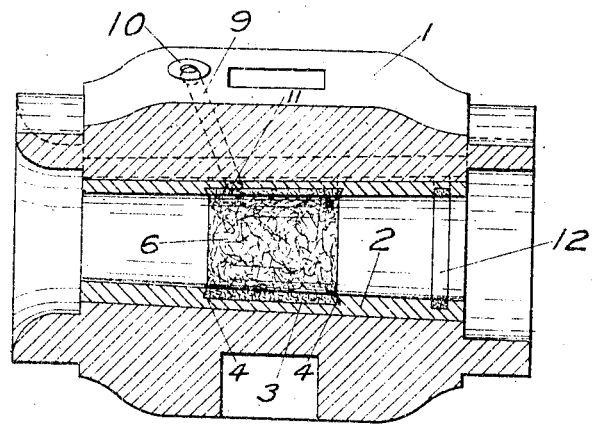
Figure 2:
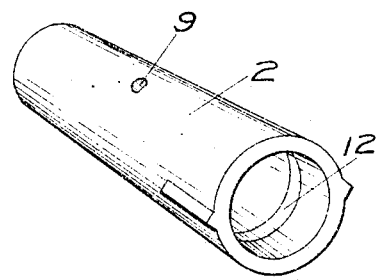

Figure 1 is a longitudinal sectional view of a wagon wheel hub provided with a box or thimble embodying my invention; Fig. 2 is a perspective view of said box or thimble removed from the hub; and Fig. 3 is a sectional view of a wheel hub, showing axle or spindle in place therein, and showing the position of the enlarged middle portion forming the lubricating chamber relative to the spindle or skein upon which it turns.

Referring to the drawings, 1 represents a wagon wheel hub and 2 a box or thimble inserted therein in the usual manner and adapted to turn therewith. Said box or thimble is adapted to be removed at will and to be used as a substitute for the boxes now in common use without reconstruction of the hub. In forming this box or thimble 2 I form in the middle portion thereof an enlarged circumferentially-extending groove, as 3, opening through the inner bearing face thereof, and extending for a considerable distance, relatively, of the length of the box. This groove 3 forms a pocket or chamber for a purpose to be presently explained. The edges of said pocket or chamber are dove-tailed so as to overhang the pocket or chamber, as indicated at 4, in order to provide flanges for holding within the pocket the loose lubricant-retaining material, such as wool or other fibrous packing, as 6. This packing may be prepared in the form of a ring or tube of proper size and length and put into place so that the edges thereof rest under the projecting or overlapping edge flanges of the pocket and by which the packing is retained in its proper place. By reason of the flanges 4, the packing 6 is wedged thereunder, and in the rotation of the hub and the packing the greatest pressure is, of course, at the under side of the axle spindle, with comparatively little pressure at the upper side of the latter. Because of the last mentioned condition the packing at the upper side of the spindle would be liable to sag and fall away from the groove 3, but by the formation of the dove-tailed flanges 4, and the wedging of the packing 6 thereunder, the packing is as securely held within said groove while at the upper side of the spindle as at the lower side thereof. Furthermore, in the end thrust of the wheel, as when the same is placed upon or removed from the axle spindle, the wedging of the packing under the flanges 4 precludes displacement of the packing from the groove 3, so that the wheel is free to be moved in the manner noted without danger of loosening the packing in the groove.

The pocket or recess, it will be noticed, is comparatively wide and is formed in the middle portion of the box or thimble. This performs two important functions. It forms a comparatively wide lubricating surface surrounding and engaging the spindle or axle upon which it turns and contains sufficient lubricant so that the turning of the box upon the axle or spindle causes said lubricant to work toward each end of the box or thimble, between the bearing faces of the box and spindle. This is brought about by the wiping effect between the turning box and packing and the spindle. The other important function is that by enlarging the middle portion of the box for a considerable extent longitudinally thereof, that portion of the box is removed which, in the ordinary or straight box, forms a fulcrum upon which the hub rocks as the spindle or skein and the box commence to wear at their opposite ends. This wear is more pronounced on the underside of the spindle or skein of the axle at the inner end of the hub, and on the upper side thereof at the outer end thereof, as at the points designated 7 and 8, Fig. 3. The rocking or oscillating of the hub while it is turning upon the spindle or skein causes the bearings at these points to wear in increasing ratio, and this rocking and the consequent wear are materially diminished by forming the interior middle portion of the box as above referred to. I have found that the only practical way of forming this kind of pocket or chamber in the box, is in its molding with properly constructed cores, but do not limit myself to any particular way of putting the pocket or chamber in the box. In order to put lubricant into said pocket and the packing material contained therein, the hub is provided with an oil port or passageway, as 9, closed at its upper end with an automatic valve member, as 10, which may be of any desired type. Said passageway connects at its lower end with an opening through the wall of said box or thimble, as 11. By this construction, oil or other liquid lubricant from the ordinary oil can, can be quickly and readily put into the packing material within the box or thimble, where it is readily absorbed and applied to the bearing surface. I have also provided means for preventing dust and dirt from working into said box or thimble and injuring the bearing faces of the box and spindle upon which it turns. This means comprises a ring of felt or other closely woven material as at 12, retained in a circumferentially extending pocket in the inside of said box or thimble adjacent the inner end thereof. This not only acts as an effective dust and dirt guard, but prevents any of the lubricant from working out through the end of the box.

The invention provides not only a very simple and improved construction of lubricating wheel box, but a construction which is practicable for the reason that it saves labor and time, and being adapted to the hubs in common use without their reconstruction, it may be used to replace them without much cost.

I have shown the preferred embodiment of the invention, which, briefly stated, comprises a removable box or thimble, provided with a comparatively wide, inwardly opening, lubricating pocket or chamber and with a dust guard, constructed to perform the functions stated, and I am aware that slight changes can be made without departing from the spirit of the invention. I do not, therefore, limit the invention to the particular showing made for purposes of illustration only.

I claim:

A detachable rotatable packing box for wagon wheels comprising, a box proper tapering throughout its length and provided at its inner face with a circumferential groove of substantial area extending substantially equidistantly at both sides of the central portion of the box, the ends of said groove having overhanging flanges, a packing tube of fibrous material arranged in said groove and wedged under said overhanging flanges, whereby said packing tube is held in said groove against displacement during endwise thrust of the box in relation to an axle spindle, and means for feeding a lubricant to the packing tube in said groove.

JOHN D. JONES.

Witnesses:
L. E. MEACHAM,
LLOYD ARMSTRONG.